United States Patent [19]

Stengel

[11] Patent Number: 5,492,711
[45] Date of Patent: Feb. 20, 1996

[54] PRECOOKED PRESERVATIVE-FREE COMMERCIAL SEMI-MANUFACTURED PRODUCT FOR PROCESSING TO GIVE A CRISPY FOOD SUITABLE AS A SNACK

[75] Inventor: Hans Stengel, St. Sulpice, Switzerland

[73] Assignee: Helene Stengel, St. Sulpice, Switzerland

[21] Appl. No.: 151,760

[22] Filed: Nov. 15, 1993

[30] Foreign Application Priority Data

Nov. 17, 1992 [CH] Switzerland .............. 3527/92

[51] Int. Cl.⁶ ............................................. A23L 1/16
[52] U.S. Cl. .................. 426/557; 426/89; 426/94; 426/138; 426/438; 426/439; 426/451; 426/512
[58] Field of Search .................... 426/557, 451, 426/512, 439, 438, 94, 138, 89, 283

[56] References Cited

U.S. PATENT DOCUMENTS

| | | | |
|---|---|---|---|
| 3,997,676 | 12/1976 | Ando | 426/113 |
| 4,483,879 | 11/1984 | Sueisawa et al. | 426/451 |
| 4,493,850 | 1/1985 | Fioravanti | 426/283 |
| 5,059,433 | 10/1991 | Lee et al. | 426/94 |
| 5,151,289 | 9/1992 | Ozawa et al. | 426/557 |
| 5,283,071 | 2/1994 | Taylor et al. | 426/274 |

OTHER PUBLICATIONS

Lebain et al, "The Taste of China" Publish 1990, pp. 106–107.

Primary Examiner—Donald E. Czaja
Assistant Examiner—Lien Tran
Attorney, Agent, or Firm—Wenderoth, Lind & Ponack

[57] ABSTRACT

A precooked semi-manufactured product which is free from preservatives and is commercial. It is intended for processing to give a crispy food suitable as a snack and features a) a casing made of noodles, optionally mixed with sesame, and b) a savory or sweet filling. The noodles are bonded together by mixing the vegetable oil. To produce the semi-manufactured product, the noodles are cooked al dente, rinsed, allowed to drain thoroughly in a sieve, mixed thoroughly with vegetable oil and laid in the bottom part of a well buttered mold. The mold is composed of heat-conducting material, which is safe for the food industry. The filling is laid on to the middle of the noodle layer and covered well with noodles. The well buttered lid is put on. The mold is firmly closed and heated for approximately 5 minutes in an oil bath at approximately 200° C. During this, no oil may penetrate into the mold. The semi-manufactured product is fried in vegetable oil until golden brown, as a result of which a crispy food suitable as a snack is obtained.

24 Claims, No Drawings

PRECOOKED PRESERVATIVE-FREE COMMERCIAL SEMI-MANUFACTURED PRODUCT FOR PROCESSING TO GIVE A CRISPY FOOD SUITABLE AS A SNACK

BACKGROUND OF THE INVENTION

FIELD OF THE INVENTION

The invention relates to a prebaked preservative-free commercial semi-manufactured product for processing to give a crispy food suitable as a snack; to a process for the production of the same; to a crispy food, suitable as a snack, which is obtainable by final frying of the semi-manufactured product; and to a process for processing the semi-manufactured product to give a crispy food suitable as a snack.

SUMMARY OF THE INVENTION

The semi-manufactured product according to the invention has a) a casing of noodles, optionally mixed with sesame, which noodles are bonded together by mixing with vegetable oil, and b) a savory or sweet filling.

DESCRIPTION OF THE PREFERRED EMBODIMENTS

The noodles preferably have an at least approximately square or circular cross-section having a side length of approximately 2 mm or a diameter of approximately 2 mm respectively.

The thickness of the noodle casing is preferably approximately 1 cm and the thickness of the filling is likewise approximately 1 cm. The semi-manufactured product can be for example at least approximately rectangular having a length of approximately 12 cm, a width of approximately 8 cm and a height of approximately 3 cm or can be at least approximately circular having a diameter of approximately 11 cm and a height of approximately 3 cm.

If the filling is savory, it can contain as the major constituent meat or meat products, poultry, fish, seafood, vegetables or cheese or mixtures thereof. If it is sweet it can contain as major constituent fruits, milk products, nuts or cocoa or mixtures thereof.

The semi-manufactured product according to the invention can be packed to be airtight and water vapor tight in a wrapper made of plastic film, preferably transparent film. The air inside the wrapper is optionally replaced by an inert gas, such as nitrogen and/or carbon dioxide. However, the semi-manufactured product can be alternatively vacuum-packed in the wrapper.

The noodles can for example be dyed green, brown, yellow or red with colorants or natural products permitted for foods. The noodles can also be wholemeal noodles.

To produce the semi-manufactured product, the noodles are cooked al dente, rinsed, allowed to drain thoroughly in a sieve and mixed thoroughly with vegetable oil and, if desired, sesame, so that a certain bonding of the noodles with each other is achieved. The bottom part of a well buttered mold made of heat-conducting material safe for the food industry, for example stainless steel, is then covered with the noodles. The noodle layer preferably has a height of approximately 1 cm. The filling is then laid on to the middle of the noodle layer and it is well covered with noodles. The filling and the side covering and top covering of the noodles preferably likewise has a thickness of approximately 1 cm. Thereupon, the equally well buttered lid of the mold is put on, the mold is firmly closed in a suitable manner and heated for approximately 5 minutes in an oil bath heated to approximately 200° C. During this, no oil may penetrate into the mold.

After cooling, the semi-manufactured product is removed from the mold. If it is not immediately further processed, it can be packed to be airtight and water vapor tight for storage in a wrapper made of plastic film, preferably transparent film. To maintain freshness, the air in the wrapper can be replaced by an inert gas, such as nitrogen and/or carbon dioxide. Alternatively, the semi-manufactured product can be vacuum-packed. However, it is likewise possible to store the semi-manufactured product in the deep freeze, optionally after shock-freezing.

Immediately after removal from the mold or after storage, the semi-manufactured product can be fried until golden brown in vegetable oil, enough oil preferably being used so that the semi-manufactured product is just covered by the oil. In this manner a crispy food suitable as a snack is obtained.

The production of the semi-manufactured product according to the invention is described below with the aid of examples.

EXAMPLE 1 a) Production of the noodles

| A dough is prepared from |
| --- |
| 900 g of white flour |
| 100 g of fine wheat semolina |
| 6 eggs |
| 60 g of olive oil |
| 20 g of sea salt |
| 5 g of white ground pepper | from which dough noodles of 2 mm diameter are produced and cooked al dents in boiling water. Immediately after cooking they are rinsed somewhat. The noodles are allowed to drain in a sieve and are then thoroughly mixed in a dish with olive oil until a slight bonding between the noodles has resulted. They can be mixed with roasted sesame.

b) Production of the semi-manufactured product

A stainless steel mold having the dimensions 12×8×3 cm is used. The contents of such a mold weigh approximately 220 to 250 g. The bottom part of the mold is well buttered and filled approximately 1 cm deep with the noodles. The filling absolutely must be prevented from penetrating through the noodles; it is therefore necessary that the mold is covered absolutely exactly with noodles. The filling, which may contain only a little water, is laid approximately 1 cm deep in the center of the mold and covered well with noodles on all sides. The equally well buttered lid is then put on and the mold is firmly closed by a clasp. The mold is then deep-fried for 5 minutes in an oil bath heated to 200° C., little steam forming in the mold if the filling does not contain too much water. The mold is then removed from the oil bath. After one minute the lid is removed and the contents are taken out of the mold.

The semi-manufactured product thus obtained is either immediately further processed or, after cooling, vacuum-packed in a plastic film or packed under a protective gas, for example nitrogen, or stored in the deep freeze.

c) Further processing of the semi-manufactured product

If the semi-manufactured product has been stored in the deep freeze, it is taken out one hour before further processing. It is then finally fried golden brown in a pan which is filled 3 cm deep with vegetable oil, so that a crispy, well-shaped product is obtained, which has absorbed little oil and is therefore easily digestible.

EXAMPLE 2

Production of a beef filling for the process described in Example 1

3 dl of peanut oil are heated and 150 g of finely chopped shallots and 20 g of garlic paste are lightly browned together in the peanut oil. 1 kg of coarsely minced beef shoulder is added and further browned. 500 g of peeled chopped San Marzano tomatoes are added. The mixture is then dusted with 100 g of flour and this is lightly browned. Finally, 3 dl of red wine are added and 1 l of meat are poured in. The mixture stock is then well seasoned with 50 g of salt, 20 g of white pepper, 20 g of harissa, 5 g of rosemary, 5 g of thyme and 5 g of basil. The mixture is allowed to simmer lightly for I hour until it is "dry".

This recipe is sufficient for 30 portions at 70 g each.

EXAMPLE 3

Production of a vegetarian filling for the process described in Example 1

200 g of sesame are dry roasted and mixed with 2 kg of the noodles produced as in Example 1a).

The filling mentioned in Example 1b) is produced as follows:

2 dl of olive oil are heated and 200 g of finely chopped shallots are softened therein. 1 kg of leek julienne strips are blanched and added. 200 g of soybean sprouts and 500 g of sweetcorn are then added successively. Finally, the mixture is well seasoned with 100 g of finely chopped Italian parsley, 60 g of salt and 40 g of harissa and the whole is dusted with 50 g of flour and 50 g of semolina. 5 dl of vegetable stock are then poured on to the mixture. The whole is allowed to thicken well.

This recipe is sufficient for 25 portions at 70 g each.

EXAMPLE 4

Production of a paprika cabbage and bacon cube filling for the process described in Example 1

2 dl of peanut oil are heated and 200 g of finely chopped onions and 60 g of red paprika are browned slightly therein. 100 g of flour are added, whereupon 2 dl of white wine are added. 1.5 kg of sauerkraut are then added. After 5 dl of water are added, the mixture is well seasoned with 40 g of salt, 20 g of sugar, 30 g of cumin powder, 30 g of yellow mustard grains and 10 g of thyme leaves. Finally, 750 g of lean bacon are diced into cubes of 5 mm side length and are mixed in.

This recipe is sufficient for 35 portions at 70 g each.

EXAMPLE 5

Production of a ham and cheese filling for the process described in Example 1

| A choux pastry dough is produced from |
| --- |
| 150 g of flour<br>100 g of butter<br>1 egg<br>1 dl of vegetable broth. |

500 g of boiled ham are diced into cubes of 3 mm side-length. 300 g of Emmenthal are coarsely grated and 200 g of leeks are sliced transversely and blanched. 50 g of Italian parsley are chopped. For seasoning, 20 g of salt, 10 g of ground pepper and 10 g of ground nutmeg are used. The whole is mixed together until a homogeneous mass is formed.

This recipe is sufficient for 20 portions at 70 g each.

EXAMPLE 6

Production of a poultry filling for the process described in Example 1

3 dl of peanut oil are heated and 200 g of finely chopped shallots are lightly browned therein. 40 g of hot curry powder are added. 400 g of leek julienne strips are blanched and mixed in. 2 dl of white wine are added. 5 dl of poultry stock are poured in and allowed to boil. 1 kg of poultry legs are blanched in a good stock and then cut into strips according to the fibers. The meat is dusted with 50 g of semolina and 50 g of flour and seasoned with 60 g of salt. This is supplemented with the curry-leek mixture and allowed to thicken.

This recipe is sufficient for 25 portions at 70 g each.

EXAMPLE 7

Production of a tuna fish filling for the process described in Example 1

3 dl of peanut oil are heated. 400 g of finely chopped shallots and 40 g of garlic paste are lightly browned together therein. 1 kg of peeled San Marzano tomatoes are chopped and added. 2 kg of fresh tuna fish are finely chopped and added, whereupon the mixture is allowed to boil vigorously. The mixture is seasoned with 100 g of salt, 40 g of harissa and 80 g of basil paste and is then dusted with 100 g of semolina and 5 dl of water are poured in. The mixture is allowed to thicken slowly for half an hour until the mass is dry.

This recipe yields 60 portions at 70 g each.

EXAMPLE 8 a) Production of the noodles

| Sweet noodles are produced from |
| --- |
| 900 g of wheat flour<br>100 g of fine wheat semolina<br>6 eggs<br>1 dl of olive oil<br>10 g of salt |

-continued

| Sweet noodles are produced from |
| --- |
| 80 g of sugar | corresponding to Example 1a). 100 g of dry, roasted sesame can be added.

The production and the further processing of the semi-manufactured product are carried out as described in Example 1b) and Example 1c).

EXAMPLE 9

Production of a sweet filling for the process described in Example 8

1 kg of brown sugar is added to i kg of peeled and finely ground almonds. 1 kg of white dried pears are diced into cubes of 5 mm side length. These ingredients are mixed thoroughly with the juice and the grated peel of 5 untreated oranges.

This recipe yields approximately 3.5 kg of filling or 70 portions at 50 g each.

EXAMPLE 10

Production of a sweet filling for the process described in Example 8

1 kg of brown sugar is added to i kg of peeled and finely grated almonds. 1 kg of whole pine nuts are added. The mixture is mixed thoroughly with the juice and grated peel of 5 untreated oranges.

This recipe yields approximately 3.5 kg of filling or 70 portions at 50 g each.

I claim:

1. A precooked preservative-free commercial product for processing to give a crispy food suitable as a snack, which product comprises
   a) a covering of cooked noodles, which noodles are mixed with vegetable oil as a binder, and
   b) a savory or sweet filling completely enclosed on all sides in said covering such as to prevent said filling from penetrating through said noodles, and
   wherein said covering with said filling is subjected to a precooking treatment.

2. The product as claimed in claim 1, wherein the noodles have an at least approximately square or circular cross-section having a side length of approximately 2 mm or a diameter of approximately 2 mm respectively.

3. The product as claimed in claim 1 or 2, wherein the thickness of the noodle covering is approximately 1 cm and the thickness of the filling is likewise approximately 1 cm.

4. The product as claimed in one of claims 1 to 3, wherein the product has a length of approximately 12 cm, a width of approximately 8 cm and a height of approximately 3 cm.

5. The product as claimed in one of claims 1 to 3, wherein the product has a diameter of approximately 11 cm and a height of approximately 3 cm.

6. The product as claimed in one of claims 1 to 5, wherein the savory filling contains as major constituent meat or meat products, poultry, fish, seafood, vegetable or cheese or mixtures thereof.

7. The product as claimed in one of claims 1 to 5, wherein the sweet filling contains as major constituent fruits, milk products, nuts or cocoa or a mixture thereof.

8. The product as claimed in one of claims 1 to 7, wherein the product is packed to be airtight and water vapor tight in a wrapper made of plastic film, the air inside the wrapper being optionally replaced by an inert gas.

9. The product as claimed in claim 8, wherein the semi-manufactured product is vacuum-packed in the wrapper.

10. The product as claimed in one of claims 1 to 9, wherein the noodles are noodles dyed green, brown, yellow or red with colorants or natural products permitted for foods or are wholemeal noodles.

11. The product as claimed in claim 8, wherein the plastic film is transparent.

12. The product as claimed in claim 8, wherein the inert gas is nitrogen or carbon dioxide.

13. The product as claimed in claim 1, wherein the cooked noodles are mixed with vegetable oil and sesame seeds.

14. A process for production of a precooked preservative-free commercial product for processing to give a crispy food suitable as a snack, said product comprising
    a) a covering of cooked noodles, which noodles are mixed with vegetable oil as a binder, and
    b) a savory or sweet filling completely enclosed on all sides in said covering such as to prevent said filling from penetrating through said noodles,
    which process comprises cooking noodles al dente, rinsing the cooked noodles, thoroughly draining the rinsed noodles in a sieve, thoroughly mixing the drained noodles with the vegetable oil, well buttering a bottom part of a mold made of heat-conducting material safe for the food industry, covering the buttered bottom part of the mold with a layer of the mixture of noodles and vegetable oil, placing the filling onto a middle of the layer, well covering the filling on all sides with the mixture of noodles and vegetable oil, placing a well buttered lid on the mold to firmly close the mold, and heating the mold for approximately 5 minutes in an oil bath maintained at approximately 200° C. without permitting any oil to penetrate into the mold.

15. The process as claimed in claim 14, wherein the product, after cooling, is taken out of the mold and packed to be airtight and water vapor tight in a wrapper made of plastic film.

16. The process as claimed in claim 15, wherein the product is vacuum-packed or the air in the wrapper is replaced by an inert gas.

17. The process as claimed in one of claims 14 to 16, wherein the noodles are mixed with vegetable oil and seat.

18. The process as claimed in one of claims 14 to 17, wherein the product, optionally after shock-freezing, is stored in a deep freeze.

19. The process as claimed in claim 14, wherein the heat-conducting material is stainless steel.

20. The process as claimed in claim 15, wherein the plastic film is transparent.

21. The process as claimed in claim 16, wherein the inert gas is nitrogen or carbon dioxide.

22. A crispy food suitable as a snack, obtainable by final frying in vegetable oil a precooked preservative-free commercial product comprising a) a covering of cooked noodles, which noodles are mixed with vegetable oil as a binder, and b) a savory or sweet filling completely enclosed on all sides in said covering such as to prevent said filling from penetrating through said noodles, and wherein said covering with said filling is subjected to a precooking treatment.

23. A process for processing a precooked preservative-free commercial product to give a crispy food suitable as a snack, which precooked product comprises a) a covering of cooked noodles, which noodles are mixed with vegetable oil as a binder, and b) a savory or sweet filling completely enclosed on all sides in said covering such as to prevent said filling from penetrating through said noodles, and wherein said covering with said filling is subjected to a precooking treatment, which process comprises frying the precooked product until golden brown in vegetable oil.

24. The process as claimed in claim 23, wherein enough vegetable oil is used for frying so that the precooked product is just covered by the oil.

* * * * *